United States Patent
Radestock et al.

(10) Patent No.: US 7,337,164 B2
(45) Date of Patent: Feb. 26, 2008

(54) FAST SEARCH WITH VERY LARGE RESULT SET

(75) Inventors: Guenter Radestock, Karlsruhe (DE);
Oliver M. Steinau, Mannheim (DE)

(73) Assignee: SAP AG, Walldorf (DE)

( * ) Notice: Subject to any disclaimer, the term of this patent is extended or adjusted under 35 U.S.C. 154(b) by 425 days.

(21) Appl. No.: 10/816,011

(22) Filed: Mar. 31, 2004

(65) Prior Publication Data

US 2005/0222984 A1    Oct. 6, 2005

(51) Int. Cl.
*G06F 7/00* (2006.01)
*G06F 17/30* (2006.01)

(52) U.S. Cl. ............................... 707/3; 707/2; 707/102

(58) Field of Classification Search .................... 707/9, 707/10, 201, 2–6, 102
See application file for complete search history.

(56) References Cited

U.S. PATENT DOCUMENTS

| | | | |
|---|---|---|---|
| 5,761,653 A * | 6/1998 | Schiefer et al. ................. 707/2 |
| 5,956,706 A * | 9/1999 | Carey et al. ..................... 707/2 |
| 6,513,029 B1 * | 1/2003 | Agrawal et al. ............... 707/2 |
| 6,950,823 B2 * | 9/2005 | Amiri et al. ................... 707/10 |
| 7,111,020 B1 * | 9/2006 | Gupta et al. ................. 707/201 |
| 7,171,408 B2 * | 1/2007 | Zuzarte ......................... 707/5 |
| 7,174,346 B1 * | 2/2007 | Gharachorloo et al. ..... 707/102 |
| 2003/0055813 A1 * | 3/2003 | Chaudhuri et al. ............ 707/3 |
| 2004/0210579 A1 * | 10/2004 | Dettinger et al. .............. 707/9 |
| 2005/0131914 A1 * | 6/2005 | Abdo et al. ................. 707/100 |
| 2007/0022136 A1 * | 1/2007 | Keller et al. ................ 707/102 |

OTHER PUBLICATIONS

Chen et al., "Selectivity Estimation For Boolean Queries", May 15-17, 2000, "Proceedings of the Nineteenth ACM SIGACT-SIGMOD-SIGART Symposium on Principles of Database Systems".*

* cited by examiner

*Primary Examiner*—Charles Rones
*Assistant Examiner*—Charles D Adams
(74) *Attorney, Agent, or Firm*—Mintz, Levin, Cohn, Ferris, Glovsky & Popeo, P.C.

(57) ABSTRACT

Methods and apparatus, including computer systems and program products, for executing a query on a subset of data, for example, to facilitate a fast search with a very large result set. In one general aspect, a method of executing a query includes receiving a query for execution on data in the data repository; generating an estimate of a number of results of the query; defining a subset of data in the data repository; determining whether to execute the query on the subset of the data; executing the query on the subset of the data to generate a partial set of results if the query is to be executed on the subset of the data, otherwise executing the query on the data repository to generate a complete set of results; and providing query results.

20 Claims, 2 Drawing Sheets

FAST SEARCH WITH VERY LARGE RESULT SET

BACKGROUND

The following description relates to information management systems and executing a query on a subset of data, for example, to facilitate a fast search with a very large result set.

An information management system may include a computer system and a data repository. A data repository includes data, such as documents, and may reside on a storage device. In a traditional database system, the data in the data repository typically are referred to as records. Information about the records may be available through an index of the data repository that includes properties, also known as attributes, of the records. In order to retrieve data from the data repository, a user may submit a search query through a computer system. The query may include criteria for searching, such as terms and operators. The information management system may execute the query by reviewing an index of the data repository to find entries in the index that match criteria in the query.

Depending on criteria specified in a search query and the processes used to execute a search query, the search may require the calculation of "intermediate results." Intermediate results are results that when properly linked together, can be used to generate a set of final results matching the search criteria. For example, a search using the terms "John" and "Smith" with the Boolean operator "AND" placed between the terms may require a first search for "John," which returns a first intermediate result, and a second search for "Smith," which returns a second intermediate result. The intermediate results may be linked together to generate a final result set.

In some situations only a certain number of results may be desired. Such situations may include a query where only a certain number of results are requested, and/or in calculating intermediate results where one or more of the intermediate results require only a certain number of results. For example, a query may specify that only fifty results meeting the search criteria are requested.

In the case of calculating intermediate results, the execution time of a query typically correlates to the size of the intermediate results involved because generating the intermediate results and calculating the required links typically is very time-consuming. The execution of a query is also time-consuming if the results are sorted by an attribute and only a certain number of results are desired. For example, if only fifty results are desired and it is desired that those results are sorted, a query may be executed on all data, all results from that query may be sorted, and then fifty results may be selected.

SUMMARY

Described herein are methods and apparatus, including computer program products, that implement techniques for executing a query on a subset of data.

In one general aspect, the techniques feature a method of executing a query on a data repository. That method includes receiving a query for execution on data in the data repository; generating an estimate of a number of results of the query; defining a subset of data in the data repository; determining whether to execute the query on the subset of the data; executing the query on the subset of the data to generate a partial set of results if the query is to be executed on the subset of the data, otherwise executing the query on the data repository to generate a complete set of results; and providing query results.

Implementations may include one or more of the following features. Providing query results may include making the query results available to an application program. In that case, the method may further include the application program providing query results to a user interface. Determining whether to execute the query on the subset of the data may include determining whether a sufficient number of results will be generated by executing the query on the subset of the data. Determining whether to execute the query on the subset of the data may include estimating whether executing the query on the subset of the data would generate a desired number of results. In that case the method further includes receiving a value representing the desired number of results.

The method may further include receiving a value representing the desired number of results. In that case, the query is to be executed on the subset of the data if the estimate of the number of results of the query is greater than a weighted subset estimate generated in accordance with the following estimation function:

$$R * \frac{N}{stripeSize} * F,$$

where R is the number of results desired, N is the total number of possible results, F is an arbitrary number, and stripeSize is the size of the subset of the data; and determining whether to execute the query on the subset of the data includes generating the weighted subset estimate and determining whether the estimate of the number of results of the query is greater than the weighted subset estimate. The method may further include, in response to executing the query on an (N−1)th subset of the data, determining whether a sufficient number of results have been generated; and, if a sufficient number of results have been generated, defining an Nth subset of the data in the data repository and executing the query on the Nth subset of the data, otherwise executing the query on the data repository. Generating an estimate of a number of results of the query may be generated in accordance with the following estimation functions:

$$est(NOT) = N - est(op), \ est(AND) = \frac{est(op_1) * est(op_2)}{N}, \text{ and}$$

$$est(OR) = est(op_1) + est(op_2) - \frac{est(op_1) * est(op_2)}{N},$$

where op is an operand, est( ) signifies an estimate of the operator or operand in the parenthesis, and N is the total number of possible results.

In another aspect, an information management system includes a data repository that is configured to store data and one or more processes for executing queries on the data repository. The one or more processes are operative to receive a query for execution on data in the data repository; generate an estimate of a number of results of the query; define a subset of data in the data repository; determine whether to execute the query on the subset of the data; execute the query on the subset of the data to generate a partial set of results if the query is to be executed on the subset of the data, otherwise execute the query on the data repository to generate a complete set of results; and provide query results.

Implementations may include one or more of the following features. The operation of determining whether to execute the query on the subset of the data may include determining whether a sufficient number of results will be generated by executing the query on the subset of the data. The operation of providing query results may include making the query results available to an application program. The operation of determining whether to execute the query on the subset of the data may include estimating whether executing the query on the subset of the data would generate a desired number of results. In that case, the processes may be further operative to receive a value representing the desired number of results. The one or more processes may be further operative to, in response to executing the query on an (N−1)th subset of the data, determine whether a sufficient number of results have been generated; and define an Nth subset of the data in the data repository and execute the query on the Nth subset of the data if a sufficient number of results have been generated, otherwise execute the query on the data repository.

In another aspect, a computer program product is tangibly embodied on an information carrier and the computer program product includes instructions operable to cause data processing apparatus to receive a query for execution on data in a data repository; generate an estimate of a number of results of the query; define a subset of data in the data repository; determine whether to execute the query on the subset of the data; execute the query on the subset of the data to generate a partial set of results if the query is to be executed on the subset of the data, otherwise execute the query on the data repository to generate a complete set of results; and provide query results.

Implementations may include one or more of the following features. The operation of providing query results may include making the query results available to an application program. The operation of determining whether to execute the query on the subset of the data may include determining whether a sufficient number of results will be generated by executing the query on the subset of the data. The operation of determining whether to execute the query on the subset of the data may include estimating whether executing the query on the subset of the data would generate a desired number of results. In that case, the computer program product further includes instructions operable to receive a value representing the desired number of results. The computer program product further include instructions operable to, in response to executing the query on an (N−1)th subset of the data, determine whether a sufficient number of results have been generated; and, if a sufficient number of results have been generated, define an Nth subset of the data in the data repository and execute the query on the Nth subset of the data, otherwise execute the query on the data repository.

The methods and apparatus, including computer program products, that implement techniques for executing a query on a subset of data may provide one or more of the following advantages. In scenarios where only a limited number of results or intermediate results are desired, query overhead may be reduced because the query need not be executed on all of the data. The overhead that is reduced may include overhead related to fetching data from a data repository and processor resources related to executing the query. Resources used in relaying the set of results may be reduced due to a smaller result set. Where results are sorted by an attribute, if only a limited number of results are returned from an execution of a query, sorting overhead may be reduced. In order to ensure the overall scheme optimizes resource usage of an information management system, limited portions of data may be searched only when it is estimated that those portions will return a sufficient quantity of results. The reduction of overhead and the optimization of an execution of a query may reduce the amount of time spent executing the query.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

DETAILED DESCRIPTION

The systems and techniques described here relate to information management systems and executing a query on a subset of data.

Figure 1:
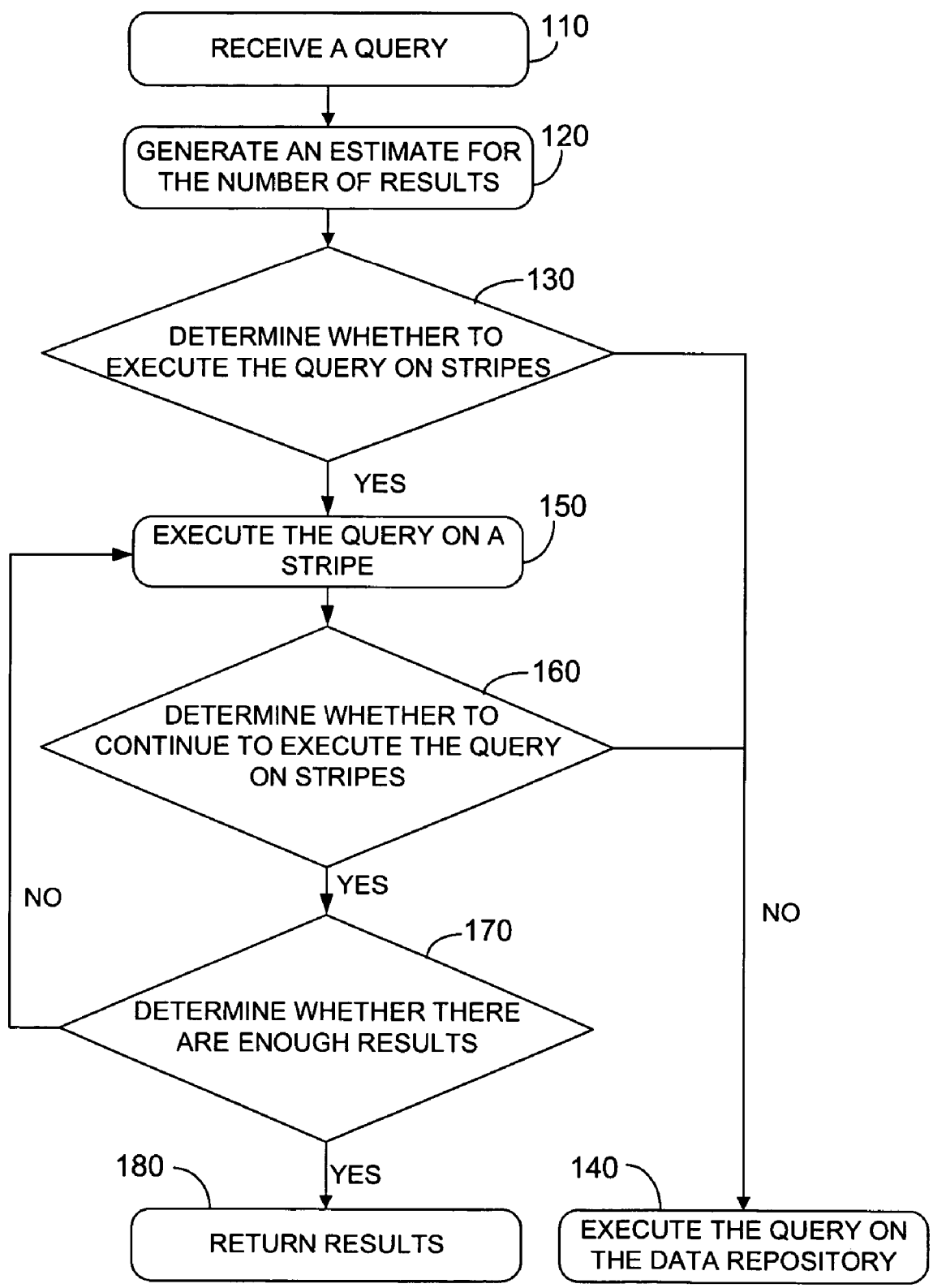
FIG. 1 is a flowchart of a method of executing a query.

FIG. 1 is a flowchart of a method of executing a query. At 110 the query is received at a computer system of an information management system that includes a data repository. The query may be received via a user interface, such as a graphical user interface of a computer system. The user interface need not be presented by a component of the information management system and may be presented separately from the one or more computer systems in the information management system. For example, a computer program that is a web-based application may forward queries to an information management and display results of those queries. The query includes criteria, which may include both terms and operators.

At 120, an estimate of the number of results from an execution of the query on the data repository is generated. The estimate is generated based on the criteria in the query and may be generated using any of a number of techniques. In one technique, where Boolean operators NOT, AND, and OR are supported by the information management system, estimates of the occurrence of terms may be generated in accordance with any technique. Using those estimates, estimation functions for each operator may be used to estimate a total number of results. The following estimation functions may be used:

$$est(\text{NOT}) = N - est(op)$$

$$est(\text{AND}) = \frac{est(op_1) * est(op_2)}{N}$$

$$est(\text{OR}) = est(op_1) + est(op_2) - \frac{est(op_1) * est(op_2)}{N}$$

In those functions, op is an operand; est( ) signifies an estimate of the operator or operand in the parenthesis; N is the total number of possible results; and, the asterisks represent multiplication. An operand is a term, or a group of terms with operators, that is related to the Boolean operator. For example, in an example query "John AND Smith," John and Smith are both terms and are also operands, whereas AND is an operator. The total number of possible results, N, represents the total number of results that might be returned as a result to a query. For example, if the data repository is composed of documents, each document is a possible result and N represents the total number of documents.

An example application of the estimate of a query using the NOT operator might be a query for "NOT Smith." In accordance with the NOT estimation function above, the estimate of the total number of results from the query is the total number of possible results minus the estimate for the number of results of the operand, i.e. the total number of results matching the term Smith.

An example application of the estimate of a query using the AND operator might be a query for "John AND Smith." In accordance with the AND estimation function above, the estimate of the total number of results from the query is the total number of results for the first operand, i.e. the total number of results matching John, multiplied by the estimate for the number of results of the second operand, i.e. the total number of results matching Smith, which is divided by the total number of possible results.

An example application of the estimate of a query using the OR operator might be a query for "John OR Smith." In accordance with the OR estimation function above, the estimate of the total number of results from the query is the total number of results for the first operand, i.e. the total number of results matching John, added to the estimate for the number of results of the second operand, i.e. the total number of results matching Smith, minus the result of the rest of the estimation function. The rest of the function is the total number of results for the first operand, i.e. the total number of results matching John, multiplied by the estimate for the number of results of the second operand, i.e. the total number of results matching Smith, divided by the total number of possible results.

In alternative implementations other techniques and other estimation functions may be used to generate an estimate for the number of results, in addition to or instead of the techniques described above.

At 130 a determination is made as to whether the query should be executed on a stripe or on all of the relevant data in the data repository. A stripe is a subset of the relevant data in the data repository, as will be discussed later. If an insufficient number of results are expected or found to be generated based on executing the query on a number of stripes, it may be beneficial to execute the query on a greater portion of the relevant data.

The determination at 130 may include determining whether it is worthwhile to execute the query on a single stripe, or any number of stripes. For example, it may be beneficial to sequentially execute the query on all of the stripes, which is still a subset of the relevant data, rather than executing the query on all of the relevant data at once. Any technique may be used to make this determination. For example, an estimate of the total number of results for executing the query on the data repository may be compared against an estimate of the number of results that might be found in a single stripe. The estimate of the total number of results for executing the query on the data repository is the estimate that was calculated in 120. The estimate of the total number of results that might be found in a stripe might be calculated in accordance with the function:

$$\frac{N}{stripeSize}$$

In that function, N is the total number of possible results and stripeSize is the size of a stripe. The size of a stripe may be a default value or chosen by other means to optimize the searching of the data repository. In order to compare the estimate of the number of results that might be found in a stripe against the estimate of the number of results that might be found in a search of the data repository, the estimate of the number of results that might be found in a stripe might be multiplied by R*F, such that the estimate of 120 is compared against $$R * \frac{N}{stripeSize} * F,$$

where R is the number of results desired, F is a safety factor, and the asterisks represent multiplication. R may be a number of final results requested. R may be a default value or a value that is input by a user as part of the query. F, the safety factor, is an arbitrary number and may be configured in a user interface. F may be used to compensate for the fact that data might not be evenly distributed in a data repository. F need not be completely arbitrary, and may, for example, be based on tests of different values for F. For example, tests may be run on a sample set of data in a sample data repository using various values for F and it may be determined that four is a desirable value for improving performance. The result of R multiplied by F, multiplied by the estimate for the number of results in a stripe is a weighted stripe estimate and is compared against the number of results estimated for executing the query on the data repository.

If the number of results estimated for executing the query on the data repository is greater than the weighted stripe estimate, i.e. if it is likely that there are R*F result documents in a single stripe, a determination may be made to execute the query on a stripe at 150. Otherwise the query is executed on the relevant data at 140.

The determination is made at 130 because, although data in the data repository might be distributed evenly such that each stripe should have a proportional number of results, there might not be a sufficiently even distribution to expect enough results to be found in the stripes. In order to offset an uneven distribution, the safety factor F may be set to bias in favor of performing the query on the relevant data set. Thus, for example, if there is a large enough discrepancy between the number of results expected in the repository and a weighted estimate of the number of results expected in the stripes, it may be more efficient to execute the query on the relevant data in the data repository rather than execute the query on the stripes.

A stripe is a subset of the data in the data repository. For example, a stripe may contain 50,000 records from a data repository that has 10 million records. In total, all of the stripes that are generated need not cover the entire data repository. For example, in one implementation, each stripe may contain 50,000 records of a data repository that has 10 million records and there may only be a total of 10 stripes. Thus, in that example, the stripes cover a combined 500,000 records of the 10 million records in the data repository. If the results to a query are to be sorted by an attribute, the stripes may be generated from a list of records that are presorted by the attribute (in ascending or descending order). Stripes may be generated in response to each query where the query is executed on the stripes, and all of the stripes may be held in memory such that a performance penalty may occur only for the first execution of the query on a stripe. Although each stripe may come from any section of the data repository, the stripe should not overlap with other stripes and the stripes may be of equivalent size. For example, a first stripe may include records 200-299 in a data repository while a second stripe includes records 300-399 in that data repository.

The query is executed on a stripe at 150, such that results to the query match the criteria of the query. The query may be executed using any of a number of techniques and various implementations of the information management system may support any type of format and operators for executing the query. For example, the information management system may support Boolean language searching or natural language searching.

At 160 a determination is made as to whether the query should be executed on more stripes. The determination may be made in accordance with any number of techniques. For example, the determination may involve determining whether, based on the number of results generated by execution of the query on stripes so far, there is likely to be enough results in the remaining stripes to satisfy the desired number of results. The determination may allow for uneven distribution of the number of results in each of the stripes. For example, the determination may factor in the possibility that one stripe has a low number of results, which may be compensated by other stripes.

One technique for making this determination may include the use of the function:

$$R * \frac{numberOfEvaluatedStripesSoFar}{totalNumberOfStripes}$$

In that function, R is the number of results desired, totalNumberOfStripes is the total number of stripes that have been generated based on the data repository, numberOfEvaluatedStripesSoFar is the number of stripes on which the query has been executed already, and the asterisk represents multiplication. The result of the function may be compared against the number of results that have been generated by executing the query on stripes. If the number of results that have been generated already is less than the result of the function, a determination may be made that executing the query on one or more remaining stripes is unlikely to generate enough results to meet the desired number of results. Thus, it may be more beneficial to execute the query on the data in the data repository than on the stripes.

If the query should not be executed on stripes, the query is executed on the relevant data in the data repository at 140. Otherwise, if the query should continue to be executed on stripes, a determination is made at 170 as to whether there are enough results already generated such that the query need not continue to be executed on stripes. If enough results are already generated, the results are returned at 180. Otherwise, the query is executed on a stripe at 150. The results may be in any format and include any degree of information. For example, in an information management system where records are documents, the results may be a list of documents or the results may be the documents. Each time the query is executed on a stripe, the query is executed on a different stripe. Thus, when results are returned, final results are a combination of the results for each stripe.

Although the information management system is discussed in FIG. 1 as including the data repository, in alternative implementations the information management system does not necessarily include the data repository. For example, the information management system may merely access a data repository. The processes of FIG. 1 may be performed on one or more computer systems, and may or might not be performed by the information management system. Although the method of executing a query is shown in FIG. 1 as being composed of several different processes, additional, and/or different processes can be used instead, and all the processes need not be part of a method of executing a query. For example, the query may be executed on stripes without having a determination, after each stripe is searched, as to whether the query should continue to be executed on the stripes. Also, for example, the processes at 110, 120, 130, 140, 150, and 180 may be desirable as a method of executing a query. Similarly, the processes need not be performed in the order depicted. For example, the process at 170 may be performed prior to the process at 160. Also, the processes need not follow the same decision paths. For example, if it is determined that there are not enough results at 170, the next process may be process 130.

Figure 2:
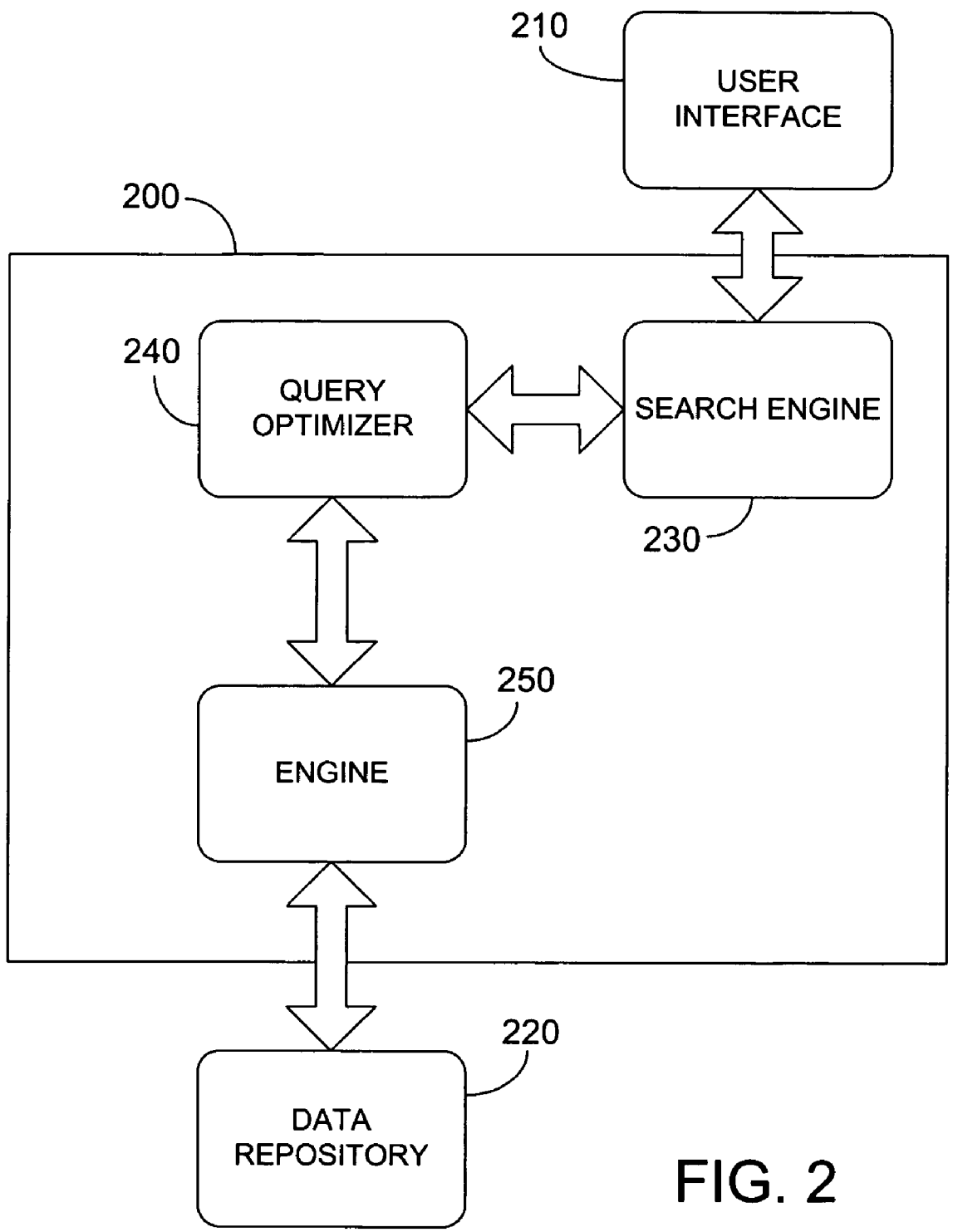
FIG. 2 is a data flow diagram of an information management system.

FIG. 2 is a data flow diagram of an information management system 200. The information management system 200 interacts with a user interface 210 and a data repository 220. The components of FIG. 2 may be part of a single computer system, or they may be part of any number of computer systems. For example, the user interface 210 may be part of the same computer system that has the data repository 220 and that computer system may access a second computer system that includes the information management system 200. The user interface 210 includes any combination of output and input devices. For example, the user interface 210 may include a display, such as a graphical user interface or a command-line interface, on a display device, in combination with a keyboard and a mouse.

The information management system 200 includes a search engine 230, a query optimizer 240, and an engine 250. The search engine 230 manages the execution of queries. The search engine 230 receives queries from the user interface 210 and forwards queries, or parts of queries, to the query optimizer 240 for optimization. In response to forwarding a query, the search engine 230 may receive results from the query optimizer 240. The results may be in any format and include, for example, records, a portion of a record, or a link to a record. In addition, the search engine 230 may manage queries by performing other tasks, such as linking results of intermediate searches for Boolean operators and preparing the results for a computer program that presents the user interface 210.

The query optimizer 240 estimates the number of results that should be returned in response to a query, determines whether the query should be executed on a stripe, generates stripes, and executes the query on one or more stripes. For example, in response to receiving a query from the search engine 230, the query optimizer 240 may generate an estimate for the number of results to that query. Based on that number of results, the query optimizer 240 can determine whether the query should be executed on a stripe. If the query optimizer 240 determines to execute the query a stripe, the query optimizer 240 can generate any number of stripes, each of which is subset of the records in the data repository 220. The engine 250 accesses the records, thus the query optimizer 240 can receive portions of the records from the engine 250 as stripes. In alternative implementations the query optimizer 240 may determine whether the query should be executed on any number of stripes. The generation of estimates and determinations by the query optimizer 240 may be performed in accordance with the functions described in relation to FIG. 1.

In alternative implementations the information management system need not include or be limited to including the search engine 230, the query optimizer 240, and the engine 250. Also, in alternative implementations the techniques illustrated in FIG. 2 may be performed with more or fewer interactions and in varying order.

Although a few implementations have been described in detail above, other modifications are possible. Other implementations may be within the scope of the following claims.

The invention claimed is:

1. A computer-implemented method of executing a query on a data repository, the method comprising:
receiving a query for execution on data in the data repository;
generating an estimate of a number of results of the query in accordance with estimation functions:

$$est(\text{NOT}) = N - est(op),$$
$$est(\text{AND}) = \frac{est(op_1) * est(op_2)}{N}, \text{ and}$$
$$est(\text{OR}) = est(op_1) + est(op_2) - \frac{est(op_1) * est(op_2)}{N},$$

where op is an operand, est( ) returns an estimate of a number of results matching an operator or the operand in parenthesis, and N is the total number of possible results;
defining a subset of data in the data repository;
determining whether to execute the query on the subset of the data, the query to be executed on the subset of the data if the estimate of the number of results of the query indicates that executing the query on the subset of the data is estimated to return a number of results greater than a threshold number;
executing the query on the subset of the data to generate a partial set of results based on the determining whether to execute the query on the subset of the data resulting in a determination to execute the query on the subset of a data; otherwise executing the query on the data repository to generate a complete set of results based on the determining; and
providing the partial set of results of the execution of the query or the complete set of results of the execution of the query.

2. The method of claim 1, wherein providing query results comprises making the query results available to an application program.

3. The method of claim 2, further comprising:
the application program providing query results to a user interface.

4. The method of claim 1, wherein determining whether to execute the query on the subset of the data comprises estimating whether executing the query on the subset of the data would generate a desired number of results, the method further comprising:
receiving a value representing the desired number of results.

5. The method of claim 1, wherein:
the method further comprises receiving a value representing a desired number of results;
the query is to be executed on the subset of the data if the estimate of the number of results of the query is greater than a weighted subset estimate generated in accordance with estimation function:

$$R * \frac{N}{stripeSize} * F,$$

where R is the number of results desired, N is the total number of possible results, F is a safety factor, and stripeSize is the size of the subset of the data; and
determining whether to execute the query on the subset of the data comprises:
generating the weighted subset estimate; and
determining whether the estimate of the number of results of the query is greater than the weighted subset estimate.

6. The method of claim 1 further comprising:
in response to executing the query on a previous subset of the data, determining whether a sufficient number of results have been generated; and
if a sufficient number of results have been generated, defining a next subset of the data in the data repository and executing the query on the next subset of the data, otherwise executing the query on the data repository.

7. An information management system including a processor, the system comprising:
a data repository, wherein the data repository is configured to store data; and
one or more processes for executing queries on the data repository, wherein the one or more processes are operative to:
receive a query for execution on data in the data repository;
generate an estimate of a number of results of the query in accordance with estimation functions:

$$est(\text{NOT}) = N - est(op),$$
$$est(\text{AND}) = \frac{est(op_1) * est(op_2)}{N}, \text{ and}$$
$$est(\text{OR}) = est(op_1) + est(op_2) - \frac{est(op_1) * est(op_2)}{N},$$

where on is an operand, est( ) returns an estimate of a number of results matching an operator or operand in parenthesis, and N is the total number of possible results;
define a subset of data in the data repository;
determine whether to execute the query on the subset of the data, the query to be executed on the subset of the data if the estimate of the number of results of the query indicates that executing the query on the subset of the data is estimated to return a number of results greater than a threshold number;
execute the query on the subset of the data to generate a partial set of results based on the determining whether to execute the query on the subset of the data resulting in a determination to execute the query on the subset of a data;
otherwise executing the query on the data repository to generate a complete set of results based on the determining; and
provide the partial set of results of the execution of the query or the complete set of results of the execution of the query.

8. The information management system of claim 7, wherein the operation of providing query results comprises making the query results available to an application program.

9. The information management system of claim 7, wherein the operation of determining whether to execute the query on the subset of the data comprises estimating whether executing the query on the subset of the data would generate a desired number of results, the one or more processes are further operative to:
receive a value representing the desired number of results.

10. The information management system of claim 7, wherein the one or more processes are further operative to:
in response to executing the query on a previous subset of the data, determine whether a sufficient number of results have been generated; and
if a sufficient number of results have been generated, define a next subset of the data in the data repository and execute the query on the next subset of the data, otherwise execute the query on the data repository.

11. The information management system of claim 7, wherein:
the query is to be executed on the subset of the data if the estimate of the number of results of the query is greater than a weighted subset estimate generated in accordance with estimation function:

$$R * \frac{N}{stripeSize} * F,$$

where R is a number of results desired, N is the total number of possible results, F is a safety factor, and stripeSize is the size of the subset of the data; and
determining whether to execute the query on the subset of the data comprises:
generating the weighted subset estimate; and
determining whether the estimate of the number of results of the query is greater than the weighted subset estimate.

12. A computer program product, stored on a computer-readable storage medium, the computer program product comprising instructions operable to cause data processing apparatus to:
generate a weighted subset estimate of performing a query on a data repository in accordance with estimation function:

$$R * \frac{N}{stripeSize} * F,$$

where R is a number of results desired, N is the total number of possible results, F is a safety factor, and stripeSize is the size of the subset of the data;
determine to execute the query on a subset of data in the data repository if the weighted subset estimate is greater than an estimate of the number of results of the query;
determine to execute the query on the data repository if the estimate of the number of results of the query is greater than the weighted subset estimate;
execute the query on the subset of data in the data repository to generate a partial set of results based on the determining to execute the query on the subset of data in the data repository or execute the query on the data repository to generate a complete set of results based on the determining to execute the query on the data repository; and
provide the partial set of results of the execution of the query or the complete set of results of the execution of the query.

13. The computer program product of claim 12, wherein the instructions are further operative to:
in response to executing the query on a previous subset of the data, determine whether a sufficient number of results have been generated; and
if a sufficient number of results have been generated, define a next subset of the data in the data repository and executing the query on the next subset of the data, otherwise executing the query on the data repository.

14. The computer program product of claim 12, wherein the estimate of the number of results of the query is generated in accordance with estimation functions:

$$est(\text{NOT}) = N - est(op),$$

$$est(\text{AND}) = \frac{est(op_1) * est(op_2)}{N}, \text{ and}$$

$$est(\text{OR}) = est(op_1) + est(op_2) - \frac{est(op_1) * est(op_2)}{N},$$

where op is an operand, est( ) returns an estimate of a number of results matching an operator or the operand in the parenthesis, and N is the total number of possible results.

15. A computer program product, stored on a computer-readable storage medium, the computer program product comprising instructions operable to cause data processing apparatus to:
generate an estimate of a number of results of a query in accordance with estimation functions:

$$est(\text{NOT}) = N - est(op),$$

$$est(\text{AND}) = \frac{est(op_1) * est(op_2)}{N}, \text{ and}$$

$$est(\text{OR}) = est(op_1) + est(op_2) - \frac{est(op_1) * est(op_2)}{N},$$

where op is an operand, est( ) returns an estimate of a number of results matching an operator or the operand in parenthesis, and N is the total number of possible results;
determine to execute the query on a subset of data in the data repository if a weighted subset estimate is greater than the estimate of the number of results of the query;
determine to execute the query on the data repository if the estimate of the number of results of the query is greater than the weighted subset estimate;
execute the query on the subset of data in the data repository to generate a partial set of results based on the determining to execute the query on the subset of data in the data repository or execute the query on the data repository to generate a complete set of results based on the determining to execute the query on the data repository; and
provide the partial set of results of the execution of the query or the complete set of results of the execution of the query.

16. The computer program product of claim 15, wherein the instructions are further operable to cause the data processing apparatus to:

in response to executing the query on a previous subset of the data, determine whether a sufficient number of results have been generated; and if a sufficient number of results have been generated, define a next subset of the data in the data repository and executing the query on the next subset of the data, otherwise executing the query on the data repository.

17. An information management system including a processor, the system comprising:

a data repository, wherein the data repository is configured to store data; and one or more processes for executing queries on the data repository, wherein the one or more processes are operative to:

generate a weighted subset estimate of performing a query on the data repository in accordance with estimation function:

$$R * \frac{N}{stripeSize} * F,$$

where R is a number of results desired, N is the total number of possible results, F is a safety factor, and stripeSize is the size of a subset of the data;

determine whether to execute the query on the subset of the data in the data repository, the query to be executed on the subset of the data in the data repository if an estimate of a number of results of the query is greater than the weighted subset estimate;

execute the query on the subset of data in the data repository to generate a partial set of results based on the determining whether to execute the query on the subset of the data in the data repository resulting in a determination to execute the query on the subset of the data; otherwise, executing the query on the data repository to generate a complete set of results based on the determining; and provide the partial set of results of the execution of the query or the complete set of results of the execution of the query.

18. The information management system of claim 17, wherein the one or more processes are further operative to:

in response to executing the query on a previous subset of the data, determine whether a sufficient number of results have been generated; and if a sufficient number of results have been generated, define a next subset of the data in the data repository and execute the query on the next subset of the data, otherwise execute the query on the data repository.

19. A computer implemented method comprising:

generating a weighted subset estimate of performing a query on a data repository in accordance with estimation function:

$$R * \frac{N}{stripeSize} * F,$$

where R is a number of results desired, N is the total number of possible results, F is a safety factor, and stripeSize is the size of a subset of data in the data repository;

determining whether to execute the query on the subset of the data in the data repository, the query to be executed on the subset of the data in the data repository if an estimate of a number of results of the query is greater than the weighted subset estimate;

executing the query on the subset of data in the data repository to generate a partial set of results based on the determining whether to execute the query on the subset of the data in the data repository resulting in a determination to execute the query on the subset of the data; otherwise, executing the query on the data repository to generate a complete set of results based on the determining; and providing the partial set of results of the execution of the query or the complete set of results of the execution of the query.

20. The method of claim 19 further comprising:

in response to executing the query on a previous subset of the data, determining whether a sufficient number of results have been generated; and if a sufficient number of results have been generated, defining a next subset of the data in the data repository and executing the query on the next subset of the data, otherwise executing the query on the data repository.

* * * * *